Feb. 28, 1933.   E. H. DARBY   1,899,016
DEHYDRATING RUBBER DEPOSITED FROM AQUEOUS DISPERSIONS
Filed Oct. 28, 1927
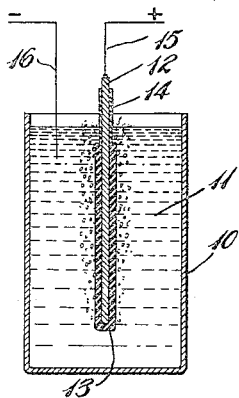
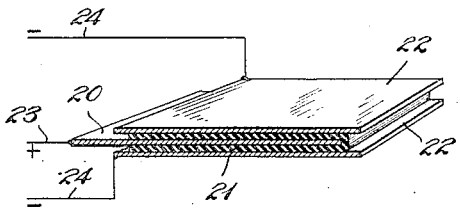
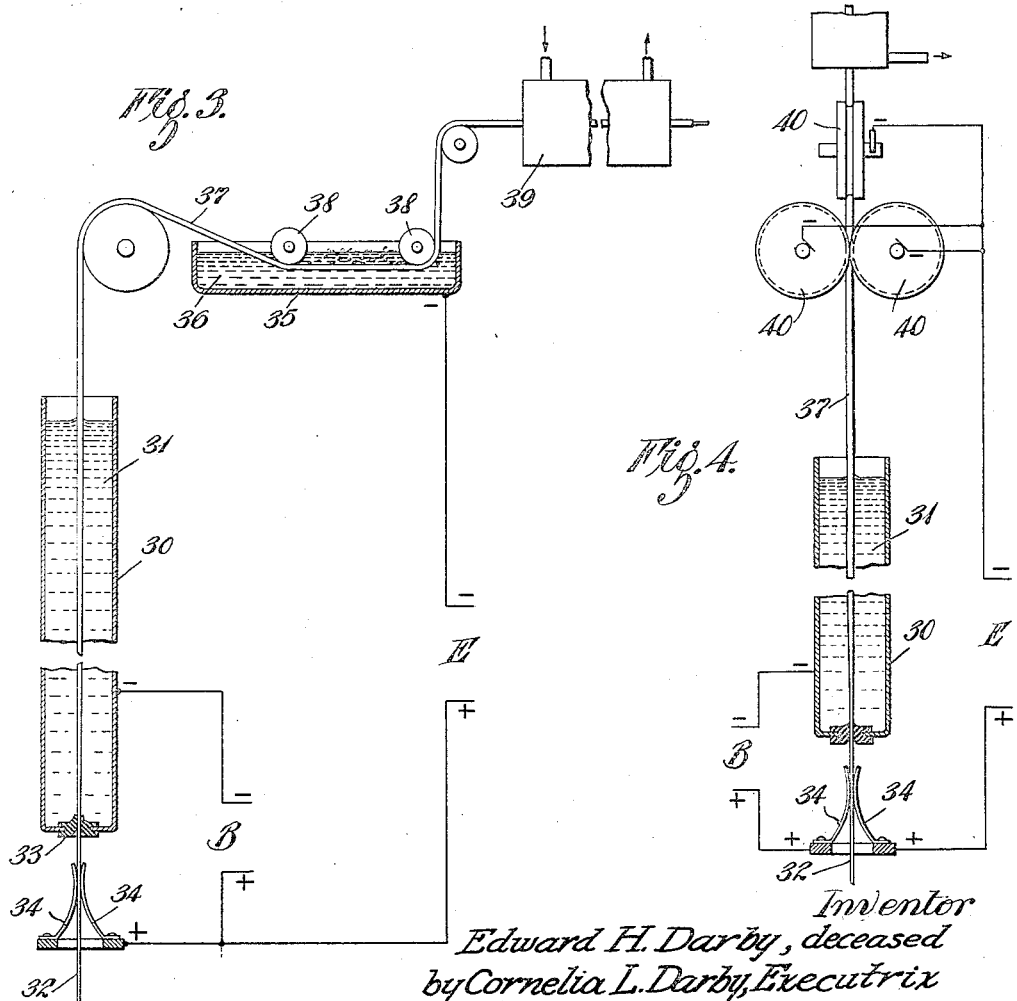
Inventor
Edward H. Darby, deceased
by Cornelia L. Darby, Executrix
By Pierson, Eakin & Avery
Attys.

Patented Feb. 28, 1933

1,899,016

UNITED STATES PATENT OFFICE

EDWARD H. DARBY, DECEASED, LATE OF ROME, NEW YORK, BY CORNELIA L. DARBY, EXECUTRIX, OF ROME, NEW YORK, ASSIGNOR TO AMERICAN ANODE, INCORPORATED, OF NEW YORK, N. Y., A CORPORATION OF DELAWARE

DEHYDRATING RUBBER DEPOSITED FROM AQUEOUS DISPERSIONS

Application filed October 26, 1927. Serial No. 229,529.

The invention relates to a method of removing water from layers of rubber, or rubber compounds, deposited on molds, mandrels or foundation members from aqueous dispersions of rubber or rubber compounds and has for an object to provide a quick, facile, and effective method for accomplishing this result.

A very serious problem in the manufacture on a commercial scale of articles and materials of rubber and like compositions directly from natural or artificial aqueous dispersions thereof resides in the difficulty of drying the deposited layers which may contain from 30 percent to as high as 60 percent of moisture. Where the deposits are in thick layers, or only in relatively thick layers compared to the thickness obtained by merely dipping a form into an aqueous dispersion, drying by means of a heated circumambient medium, such as hot air, tends to a skin formation at the surface, or a case-hardening of the deposit, so that the moisture within cannot escape or can escape only slowly. The same condition, namely, case-hardening, pertains in a somewhat lesser degree where drying is effected in the air at normal temperature. It follows that these common methods of drying are, due to the length of time required to remove the excess moisture, commercially impractical for any but very thin films of deposited rubber.

It has been found that where articles or materials of rubber composition are formed from aqueous dispersions thereof on an electrically-conductive material, an extremely rapid and efficient drying of the rubber deposit may be effected by surrounding the rubber deposit with a suitable conducting medium, such as mercury or other liquid or conducting solution, or by placing the outer surface of the rubber deposit in contact with metal plates, the conducting medium or metal plates, as the case may be, being connected to the negative pole and the electrically-conductive material on which the rubber is deposited being connected to the positive pole of a source of electric current.

Experiments demonstrate that the amount of water removed and the rate of removal increases with the voltage of the current and that as high as 90 percent of the water contained in the deposit can be removed in a few minutes by impressing sufficient voltage to maintain a fairly constant flow of current through the deposited rubber.

The invention may be more readily understood by reference to the accompanying drawing in which Fig. 1 is a view in section of a simple immersion apparatus for electro-osmotically removing water from freshly formed rubber layers; Fig. 2 is a perspective view of a plate contact device for performing a similar function; Fig. 3 is a diagrammatic sectional view of an apparatus for continuously electrodepositing an insulating coating on a core and for continuously removing the water from the insulation; and Fig. 4 is a similar view showing a modified apparatus.

In Fig. 1, there is shown a simple apparatus for carrying out my invention comprising a receptacle 10 filled with an electro-conducting liquid 11, such as an electrolyte solution or mercury, and a metal plate 12 coated with an aqueous rubber composition 13, the portion of the plate 12 not so coated may be covered with an insulation 14, such as wax, to prevent a short circuiting of the current when the plate 12 is immersed below the upper margin of the rubber layer 13, as shown in the drawing. The plate 12 is connected to the positive pole of an electric current source, as by lead wire 15, and a lead wire 16 connected with the negative pole of the current source may have its end immersed in the electro-conductive liquid 11 or attached to the receptacle 10, if the latter is of electro-conductive material.

The following test actually made with apparatus similar to that shown in Fig. 1 demonstrates the rapidity and effectiveness of the process of the present invention. A zinc plate weighing 7.8 grams was coated with an aqueous rubber composition by electrodeposition. The coated plate was removed from the electro-depositing bath and the surface moisture removed by patting with absorbent paper. A weighing of the coated plate showed that the rubber deposit weighed 6.1 grams. The plate was then made the positive pole and dipped into the cup of mercury which was made the negative pole. A current at 70 volts was applied for 20 seconds at the end of which time the weight of the rubber deposit was reduced to 4.5 grams or a loss in weight of 35.6 percent based on weight of the dry rubber content, the original water content of the deposit being about 40 percent.

The construction of Fig. 2 is useful in drying flat sheets of rubber freshly formed from an aqueous dispersion thereof. The metal plate 20 with its covering of freshly deposited rubber 21 is placed between the metal plates 22. The plates 20 and 22 are connected respectively to the positive and negative poles of an electric current source as by leads 23 and 24. When the current is applied, the water is rapidly driven out from the rubber deposit.

In Fig. 3 is shown an apparatus for continuously coating continuous lengths of strip material, such as wire, with an insulating compound from an aqueous dispersion thereof and for continuously removing the water from the insulation. A long tubular tank or receptacle 30, preferably of electro-conductive material, is adapted to contain an aqueous dispersion 31 of any desired insulating compound and to be connected with the negative pole of a current source B. A wire 32, or other strip material, is arranged to be drawn upwardly through the tubular tank, the wire entering the tank through an insulator 33, preferably made of soft vulcanized rubber, which also serves to seal against leakage about the wire. Situated below the tank are brushes 34 which contact with the wire 32 and are connected to the positive pole of the above mentioned current source B as well as to a second current source E.

Disposed in convenient juxtaposition to the depositing tank 30 is a dehydrating chamber 35 containing an electro-conducting liquid 36, which is connected to the negative pole of the current source E. Suitable guiding and supporting members for the insulated wire 37 as it leaves the tank 30 and passes to, through and from the chamber 35 are provided, such as rollers 38. In certain cases it may be desirable further to dry the insulation of the wire as it leaves the dehydrating chamber 35. For this purpose, a drying chamber 39 may be employed for removing residual moisture after the insulated wire has been treated in the chamber 35, although it is to be understood that such drying chamber may be omitted or other processing mechanisms may be inserted either before or after the insulated wire has traversed the chamber 35, if necessary or desirable.

The construction shown in Fig. 4 is similar to that of Fig. 3 except that the liquid containing dehydrating chamber 35 is replaced by the metal shives or grooved rollers 40, of which one, two or more sets may be employed, connected to the negative pole of the current source E, and between which rollers 40 the insulation is both compressed mechanically and acted upon electro-endosmotically to remove water from the deposit.

The operation of the constructions of Figs. 3 and 4 is obvious from the above description. Briefly, the wire 32 is continuously passed upwardly through the tubular tank 30 filled with an aqueous dispersion of an insulating compound. A current of the order of from 20 to 60 volts, although a higher or lower voltage may be used, is passed between the tank 30 and the wire 32 through the aqueous dispersion 31, and gradually builds up by electrodeposition on the wire 32 as it traverses the tank 30 a layer of the solid constituents of the dispersion. The coated wire 37 is then led to the dehydrating device.

In the apparatus of Fig. 3 the second current of the order from 20 to 110 volts, more or less, passes between the wire 32 and the electro-conductive liquid 36 through the insulating coating, resulting in a rapid driving out of the moisture from the insulation, the water removed mingling with the liquid 36. Since the rate of removal of the water increases with increase of the potential of the current employed, relatively high voltage currents acting for short periods are preferred. The effect of high voltage currents upon the deposit is, however, to increase the resistance to flow of current through the deposit and the voltage of the current should not for this reason be made excessively high. The surface moisture and the residual moisture may be removed by one or more drying chambers 39.

In the apparatus of Fig. 4, the insulated strip or wire passes from the depositing bath of tank 30 to one or more sets of grooved rollers 40, the latter compacting and the high potential current from source E endosmotically driving out the water from the deposited insulation. The residual moisture may be removed by evaporation, as in drying chamber 39, or by other suitable means.

It will be understood that principles of the invention herein specifically described as applicable to the coating of wire or other electro-conductive material is also applicable to the coating of fibrous materials, either in woven or unwoven form, and other pervious or porous materials. Thus, threads, cords and woven fabrics impregnated with suitable electrolytes may be coated with an aqueous rubber dispersion by spraying, dipping, spreading, or other suitable means, and then subjected to a dehydrating action by the process herein described.

The term "electrically-conductive material" is accordingly used in the present specification and claims in a generic sense to include metals or other solid conductors of electricity, and also to include pervious or porous bodies normally electrically-nonconductive, the interstices of which contain conductive substances in a sufficient degree to make such treated bodies effectively electroconductive.

It will be clear from the above description that the present invention deals primarily with the removal of moisture from relatively thick deposits of rubber by an electro-osmotic action and that it has the advantage of speed and efficiency and of being accomplished without skin formation at the exterior surface of the deposit which would retard escape by evaporation of residual moisture.

While several embodiments of this invention have been hereinabove described, it is to be understood that numerous other modifications and variations may be made therein without departing from the principles of this invention, and it is therefore not desired to limit the invention otherwise than necessitated by the prior art.

What is claimed is:

1. The process of covering continuous lengths of electrically-conductive material with a layer of normally electrically-nonconductive plastic material which comprises progressively depositing said electrically-non-conductive material in the form of an aqueous dispersion onto the electrically-conductive material, and thereafter progressively driving off from said body at least a part of its water content by electro-endosmosis.

2. The process of covering continuous lengths of electrically-conductive material with a layer of a rubber composition which comprises progressively passing said electrically-conductive material through an aqueous dispersion of a rubber composition, and depositing thereon by electrophoresis during such passage a body comprising solid constituents of said dispersion, thereafter continuing the progressive movement of the electrically-conductive material to bring its covering comprising said deposited body into and out of surface contact with a conductor of electricity and passing a relatively high potential electric current through said deposited body during said contact, the said conductor serving as a cathode.

3. In the herein described process of building an article comprising rubber from an aqueous dispersion of rubber composition, in which a self-sustaining body of said rubber composition is first formed from, and then removed from, the aqueous dispersion so that it comprises both dispersed and dispersing constituents, the step which includes driving off from said self-sustaining body at least a part of the dispersing constituents by electro-endosmosis.

4. In the herein described process of building an article comprising rubber and an electrically conductive backing material, in which a self-sustaining body of rubber composition is formed on the backing material from an aqueous dispersion of such rubber composition, said self-sustaining body comprising dispersing constituents, the step which comprises passing an electric current through said self-sustaining body by direct application of a cathodic body to the surface of said self-sustaining body, said electrically conductive material serving as an anode.

5. The process of covering an electro-conductive body with a layer of a rubber composition which comprises immersing the said material in an aqueous dispersion of a rubber composition, passing an electric current through the dispersion to the said body as an anode to deposit the solid content of the dispersion thereon, removing the body from the dispersion, placing its covering in contact with a conductor of electricity, and passing a second relatively high potential electric current through the deposit to the said body in the same direction.

In witness whereof I have hereunto set my hand this 15th day of October, 1927.

CORNELIA L. DARBY,
*Executrix of the Estate of Edward H. Darby, Deceased.*